United States Patent [19]

Toshitsugu

[11] Patent Number: 4,759,935

[45] Date of Patent: * Jul. 26, 1988

[54] FRUIT PACKAGE

[75] Inventor: Kitayama Toshitsugu, Kuroishi, Japan

[73] Assignee: Kyoei Co. Ltd., Japan

[ * ] Notice: The portion of the term of this patent subsequent to Jan. 13, 2004 has been disclaimed.

[21] Appl. No.: 945,368

[22] Filed: Dec. 22, 1986

Related U.S. Application Data

[60] Continuation of Ser. No. 824,170, Jan. 30, 1986, Pat. No. 4,636,392, which is a division of Ser. No. 734,908, May 16, 1985, Pat. No. 4,622,229.

[30] Foreign Application Priority Data

May 21, 1984 [JP] Japan .................................. 59-101898
Jul. 25, 1984 [JP] Japan .................................. 59-113277

[51] Int. Cl.⁴ ........................ B65B 25/04; B65D 77/04
[52] U.S. Cl. .................................... 426/110; 426/124; 426/119; 206/45.31; 206/45.33; 206/592; 206/589; 206/466; 206/471; 217/26.5
[58] Field of Search ............... 426/419, 316, 124, 118, 426/395, 106, 312, 119, 415, 411, 110; 206/461, 462, 466, 471, 592, 589, 593, 594, 583, 497, 45.33, 45.31; 217/26.5, 26, 27, 34, 35; 53/410, 449, 485, 145, 146

[56] References Cited

U.S. PATENT DOCUMENTS

| | | | |
|---|---|---|---|
| 1,172,779 | 2/1916 | Fargo | 217/27 |
| 1,213,550 | 1/1917 | Smith | 217/26.5 |
| 1,316,304 | 9/1919 | Henderson | 217/27 |
| 2,134,908 | 11/1938 | Copeman | 206/592 |
| 2,438,089 | 3/1948 | Carson | 206/583 |
| 2,501,570 | 3/1950 | Larsen | 206/592 |
| 2,579,415 | 12/1951 | Carson | 206/471 |
| 3,202,274 | 8/1965 | Klusmire | 206/497 |
| 3,224,569 | 12/1965 | Leitzel | 217/26.5 |
| 3,334,737 | 8/1967 | Dreyfus | 206/497 |
| 3,962,469 | 6/1976 | Leavens et al. | 217/26.5 |
| 4,333,571 | 6/1982 | Martelli | 217/26.5 |
| 4,377,598 | 3/1983 | Nugent | 206/583 |
| 4,636,392 | 1/1987 | Toshitsugu | 426/124 |

FOREIGN PATENT DOCUMENTS

| | | | |
|---|---|---|---|
| 1347181 | 11/1963 | France | 206/462 |
| 126910 | 5/1919 | United Kingdom | 217/27 |

Primary Examiner—Steven Weinstein
Attorney, Agent, or Firm—Darby & Darby

[57] ABSTRACT

A bag for receiving apples is prepared. An ethylene absorbent and a deoxidant are placed in the bag, each of the absorbent and the deoxidant being in an amount such that ethylene biosynthesis is suppressed for preserving the freshness of the apples when placed within the bag. The apples are placed within the bag and then an opening portion of the bag containing the apples, the ethylene absorbent and the deoxidant is sealed. The sealed bag allows air to permeate through it to a degree such that a minimum amount of air necessary for the apples is supplied in the presence of the ethylene absorbent and the deoxidant. The apples are stored in the sealed bag whereby maturing of the apples is delayed for preserving the freshness thereof.

6 Claims, 2 Drawing Sheets

FRUIT PACKAGE

This is a continuation of application Ser. No. 824,170, filed Jan. 30, 1986, now U.S. Pat. No. 4,636,392, which is a divisional application of Ser. No. 734,908, filed May 16, 1985, now U.S. Pat. No. 4,622,229.

The present invention relates to a process for preserving apples and a case for receiving the apples in practicing the process.

Commercially, apples are placed into market either at once after they are harvested or subsequently after storage for some time. Apples are usually stored in gas cold storage buildings for preserving for a long period of time and stored in ordinary cold storage buildings for a relatively short period preservation. By keeping in these cold storage buildings at about 0° C. apples are placed in suspended animation for keeping them fresh.

However during shipping of apples or display thereof in shops it is not practical from economical point to keep apples at about 0° C. and there is no economical substitute for preserving freshness of apples for a relatively long period of time. Thus, there is a problem in that even though apples are kept in a relatively high degree of freshness before shipping, freshness thereof becomes lost to some extent when they reach to consumers.

The inventor has studied this problem and found that ethylene is produced by biosynthesis due to absorption of oxygen into apples during they become ripe, and that ethylene existing around the apples promotes their ripening. The present invention is proposed on the basis of these findings and one aspect of the invention is directed to a process of preserving an apple. A bag for receiving the apple is prepared. An ethylene absorbent and a deoxidant are placed in the bag, each of the absorbent and the deoxidant being in an amount such that ethylene biosynthesis is suppressed for keeping freshness of the apple when the apple is placed within the bag. The apple is placed within the bag and then an opening portion of the bag containing the apple, the ethylene absorbent and the deoxidant is sealed. The sealed bag allows air to permeate through it to a degree such that minimum amount of air necessary for the apple is supplied in the presence of the ethylene absorbent and the deoxidant. The apple is stored in the sealed bag whereby the apple is delayed in becoming overripe for keeping freshness thereof.

The deoxidant restrains oxygen amount in the case within which apples are placed to thereby prevent oxygen from being used in biosynthesis of ethylene and in addition, the ethylene absorbent absorbs ethylene produced from the apples. These suppress the promotion of ripening of the apples due to ethylene. The apple case permits an appropriate amount of air to permeate through it and hence minimum amount of air necessary for suspended animation of the apples is secured.

Since the apples in the case are thus delayed in mature, their freshness is maintained for a relatively long period of time even if they are not stored at sufficiently low temperature. Thus, the loss of freshness of apples during shipping and display in shops is reduced and fresh apples are supplied to consumers.

Another aspect of the present invention is directed to a case for preserving apples comprising: (a) a case body having a front plate and a rear plate, the front plate having a plurality of openings; and (b) a resilient bag sealingly containing the apples, each apple being disposed to partly project from corresponding one of the openings so that the apple is stationarily supported on the case body by depressing an upper portion, situated between the apples, of the bag due to resilient deformation of the bag with the top plate of the case body.

Consumers can see the contained apples from the outside of this case and hence the case makes a good show in shops. During shipping, the apples are prevented from impinging upon each other.

Figure 1:
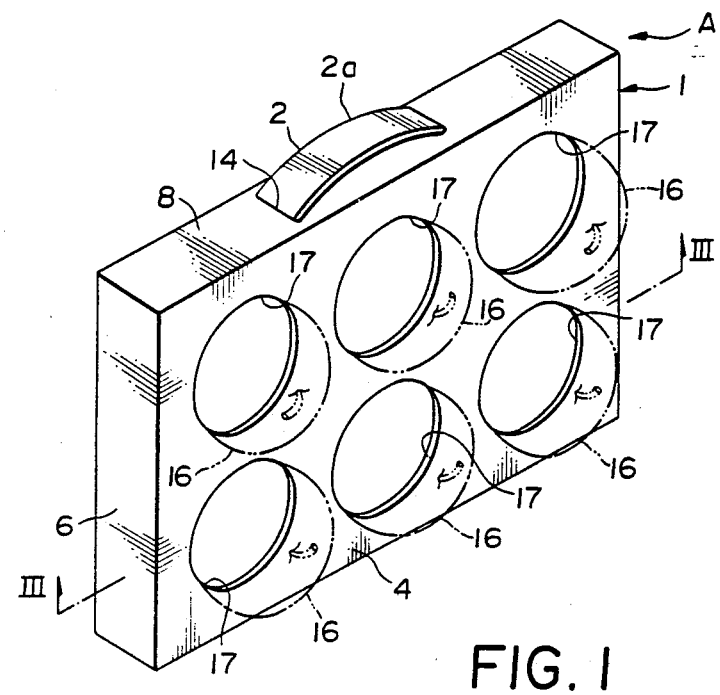
FIG. 1 illustrates a perspective view of a case, which receives apples, according to the present invention.

The bag may be made of any suitable synthetic resin such as a polyethylene. In the case of a polyethylene bag, the thickness thereof is preferably about 0.03 mm in view of permeability of air, but it is also determined in view of weight of apples to be contained. For 1 Kg of apples the polyethylene bag has typically a thickness of about 0.05 mm.

The deoxidant or disoxidant may, according to the present invention, include activated iron oxide, activated carbon or like deoxidants.

The ethylene absorbent may, according to the present invention, include zeolite or other similar conventional adsorbents. Zeolite and activated iron oxide are preferably each used in an amount of about 10 g for 1 Kg of apples sealed in a polyethylene bag 0.05 mm thick.

EXAMPLES

Apples having variety names "Iwai" and "Fuji", both resigstered in Japan, were prepared. For each example, several samples were prepared, in each of which apples in amount of about 1 Kg were sealingly packed in a 26×60 cm polyethylene bag having a thickness 0.05 mm. Each polyethylene bag contained 10 g of a deoxidant sold by Mitsubishi Gasu Kagaku, Japan, under the tradename "Ageless S-300." This deoxidant included a larger part of activated iron oxide and the rest was activated carbon. Further, each bag contained 10 g of zeolite as the ethylene absorbent. These samples were stored in a cold room maintained at 10° C. at which cold show cases of shops are usually kept. After specified periods of time, sample apples were determined with respect to acidity, saccharine degree, hardness and rate of decrease in weight on the following conditions:

(1) Acidity

Titratable acidity was measured by using as an indicator 20% of alcohol having 0.1% of phenol red and 0.1% of bromthyrol blue dissolved in it.

(2) Saccharine Degree

Soluble solid contents (refractometer saccharine degree) were determined by refractometer.

For the acidity and saccharine tests 10 g from each of five apples were sampled for each sample, to which was added water to obtain 125 cc of a test sample liquid, from which a homogenate was made by a homogenizer. The homogenate was filtered with a cloth and then subjected to centrifugal separation to obtain a supernatant liquid. This liquid was subjected to the tests.

(3) Hardness

Hardness tester was used.

(4) Weight Decrease Ratio

Weight was determined by means of a platform balance.

(5) Organoleptic Tests

Further, the apples were subjected to organoleptic tests by eight panelists with respect to succulence, hardness, sourness, sweetness, freshness and overall evaluation. Five stage evaluation were made in which a higher value was given to an apple having a higher evaluation. With respect to hardness, a value of 3 was given to an apple which was just right for eating and lower values were given to apples softer than it and higher values were given to apples harder than it.

These tests were carried out in unit of week and results therof for Iwai apples are given in Table 1 under a item "Apples with ethylene absorbent+deoxidant" and for Fuji apples in Table 2 under the same item.

COMPARATIVE TESTS

Tests similar to the preceding Examples were made in which apples were packed in paper bags (the test indicated in Tables 1 and 2 under the item "Untreated apples in paper bag)", polyethylene bags (the test under the item "Untreated apples in polyethylene bag"), polyethylene bags containing 10 g of an ethylene absorbent (the test under the item "Apples with ethylene absorbent") and polyethylene bags containing 10 g of a deoxidant (the test under the item "Apples with deoxidant"). The polyethylene bags have the same size and thickness as the bags in Examples. The ethylene absorbent and the deoxidant used were same as those used in Examples. The outcome of the tests were given in Table 1 for Iwai apples and in Table 2 for Fuji apples.

It was apparent from the results given in Tables 1 and 2 that apples preserved according to the present invention exhibited good results in almost all the tests. Specifically, Iwai apples and Fuji apples were, according to the present invention, kept excellent in qualities for 4 weeks and 8 weeks, respectively.

Figure 2:
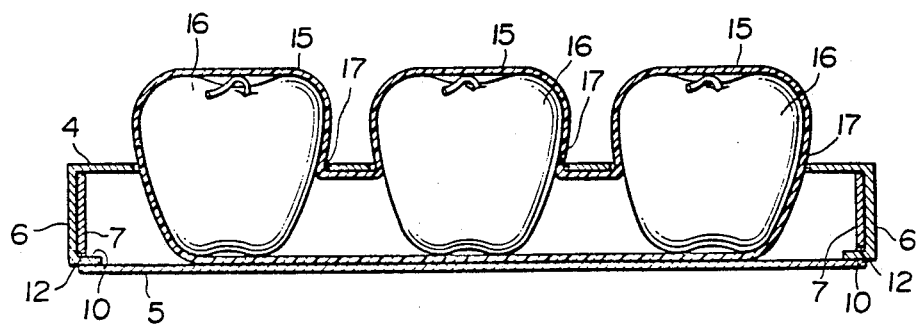
FIG. 2 is an enlarged sectional view taken along the line III—III in FIG. 1.
Figure 3:
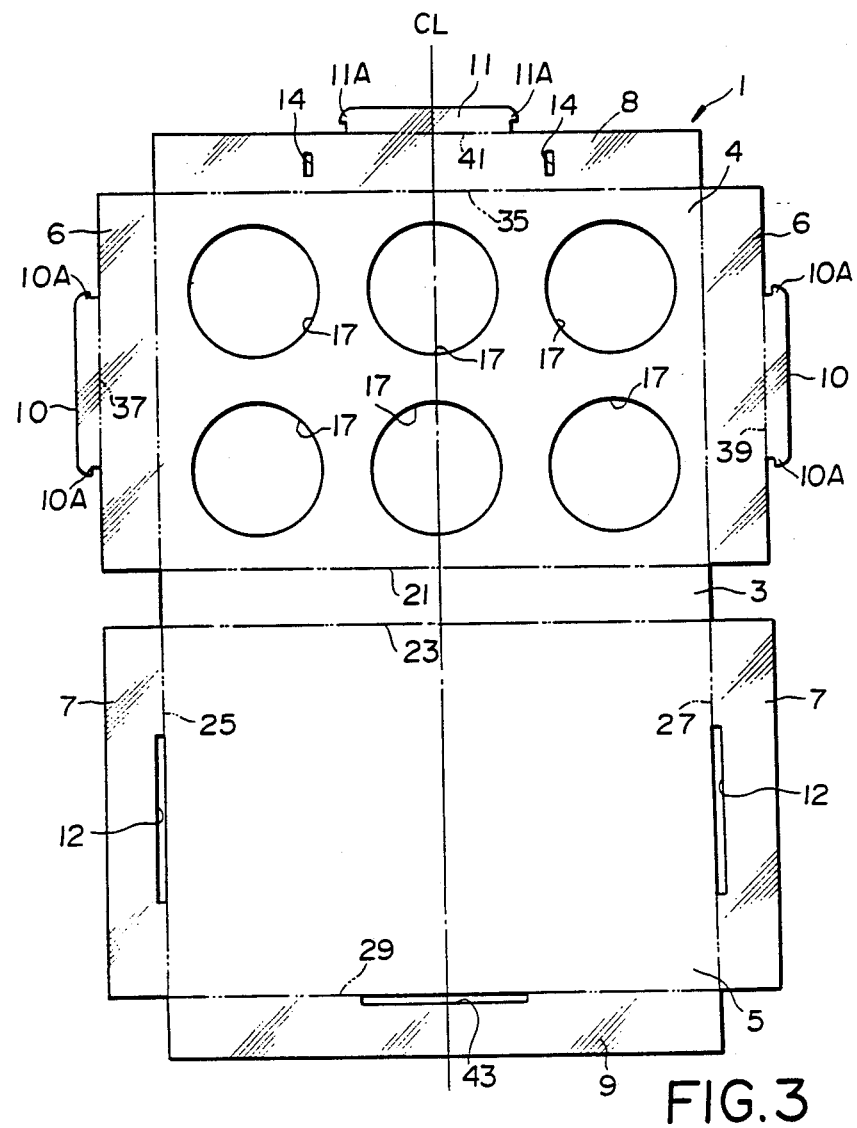
FIG. 3 is an extended view of the case body in FIG. 1.

Referring to FIGS. 1 to 3, there is illustrated a case A for use in practicing the process according to the present invention. The case A includes a hollow hexahedral box-shaped case body 1 made from a cardboard and a handle 2 made of a synthetic resin attached to this body 1. The case body 1 has a rectangular front plate 4 and a rectangular rear plate 5 integrally connected to the front plate 4 through an elongated rectangular bottom plate 3. The front plate 4 and the rear plate 5 are respectively folded with respect to the bottom plate 3 along the phantom lines 21 and 23 shown in FIG. 2. The rear plate 5 has a pair of elongated rectangular side flaps 7 and 7 integrally formed at its opposite side edges respectively and an elongated rectangular top flap 9 integrally formed at its top edge. These flaps 7, 7 and 9 are folded along the phantom lines 25, 27 and 29 respectively. The front plate 4 also has elongated rectangular side flaps 6 and 6 integrally formed with its opposite side edges respectively and an elongated rectangular top flap 8 integrally formed at its top edge. These flaps 6, 6 and 8 are also folded along the phantom lines 25, 27 and 35, respectively. The side flaps 6 and 6 have locking tongues 10 and 10 integrally formed with central portions of their free ends respectively. The locking tongues 10 and 10 are folded along the phantom lines 37 and 39 respectively. Also, the top flap 8 has a top locking tongue 11 integrally formed with a center portion of its free end. The locking tongue 11 is folded along the folding line 41. On the other hand, in the rear plate 5, each side flap 7 has a slot 12 formed through a center portion of the proximal end thereof. Each of the locking tongues 10 and 10 is passed through the corresponding slot 12 and engages with peripheral portions of the slot 12. The locking tongue 11 is passed through a slot 43 formed through a central portion of the proximal end of the top flap 9 and engages with peripheral portions of the slot 43. The top flap 8 of the front plate 4 has a pair of engaging slots 14 formed through it symmetrically with respect to the center line CL. The opposite ends of handle 2 are fitted into the slots 14 and 14 for engaging with the top flap 8. The front plate 4 has six openings 17 formed through it in three columns symmetrical with respect to the center line CL.

The handle 2 may be made of any suitable material such as a synthetic resin, metal, etc but it must have sufficient strength to bear the weight of the case plus apples. This handle includes an arcuate band body 2A and a pair of plate anchors 2B and 2B integrally formed with the opposite ends of the band body 2A to extend toward the other. The handle 2 is attached to the top flap 8 by inserting the hooking plates 2B into corresponding slots 14 and then by hooking them to portions, adjacent to the slots 14, of the top flap 8.

Figure 4:
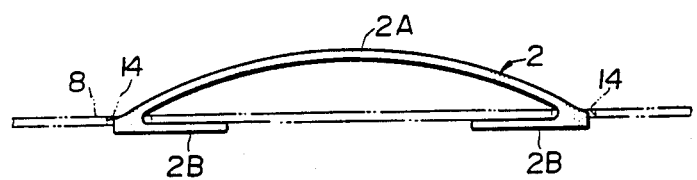
FIG. 4 is an enlarged side vew of the handle in FIG. 1.

In packing apples 16 in the case, they are previously put in a polyethylene bag 15 together with an ethylene absorbent and a deoxidant. After sealed, the bag 15 is received in the case. In this event, the six apples 16 are placed on the rear plate 5 at locations corresponding to the locations of the openings 17 formed through the front plate 4 respectively and then the front plate 4 is covered over the rear plate 5 by folding the bottom plate 3 at right angle along the folding lines 21 and 23. Thereafter, the top flap 8 is placed over the other top plate 9 by folding these flaps along the folding lines 35 and 29 respectively and is then locked there by inserting the locking tongue 11 into the locking slot 43 of the top plate 9 so that interlocking shoulders 11A and 11A formed at the opposite side edges of the tongue 11 engage with corresponding end walls of the locking slot 43 respectively. By this insertion into the slot 43 the tongue 11 is folded along the folding line 41. After this, the side flaps 6 and 6 are placed over the corresponding side flaps 7 and 7 by folding the side flaps 6 and 7 along the folding lines 25 and 27 and are then locked there by inwardly folding each side locking flap 10 along the folding line 37 or 39 and thereafter inserting the tongue 10 into the corresponding side locking slot 12 so that interlocking shoulders 10A and 10A formed at opposite side edges thereof engage with corresponding opposite end walls of the slot 12 respectively. By these operations, portions, covering spaces formed between apples 16, of the bag 15 are depressed with a resilient deformation by the front plate 4 toward the rear plate 5 as shown in FIG. 2 and thereby the apples 16 are stationarily supported in the case A by resilient force exerted by the bag 15. Finally, the handle 2 is attached to the top flap 8 by inserting each anchor 2B into the corresponding engaging slot 14 by resiliently deforming the handle portion 2A or the top flap 8 so that the anchor 25 interlocks a portion, adjacent to the slot 14, of the top flap 8 as shown in FIG. 4. The case thus assembled is illustrated in FIG. 1.

TABLE 1

|  |  | acidity (%) | saccharine degree (%) | hardness (lb/cm$^2$) | weight decrease ratio (%) | Organoleptic tests ||||||
|---|---|---|---|---|---|---|---|---|---|---|---|
|  | week |  |  |  |  | succulence | hardness | sourness | sweetness | freshness | total |
| Initial conditions | 0 | 0.57 | 9.0 | 17.4 | 0 | 2.9 | 3.6 | 3.8 | 2.4 | 3.8 | 3.3 |
| Untreated apples in paper bag | 1 | 0.39 | 5.0 | 17.6 | 1.06 | 2.7 | 3.5 | 3.2 | 2.5 | 3.3 | 2.8 |
|  | 2 | 0.28 | 6.0 | 11.8 | 0.97 | 3.0 | 2.5 | 3.0 | 2.5 | 3.0 | 2.8 |
|  | 3 | 0.19 | 6.5 | 10.3 | 3.02 | 2.8 | 2.3 | 2.1 | 2.8 | 2.2 | 2.2 |
|  | 4 | 0.48 | 7.0 | 9.9 | 3.13 | 2.3 | 2.2 | 2.5 | 2.5 | 2.2 | 2.3 |
|  | 6 | 0.29 | 4.0 | 8.7 | 5.15 | 2.5 | 1.7 | 2.8 | 2.8 | 2.5 | 2.2 |
| Untreated apples in polyethylene bag | 1 | 0.26 | 4.0 | 17.7 | 0.95 | 2.8 | 3.3 | 3.2 | 2.7 | 2.8 | 3.0 |
|  | 2 | 0.35 | 5.5 | 14.6 | 0.78 | 3.0 | 3.3 | 3.5 | 2.8 | 3.3 | 3.5 |
|  | 3 | 0.26 | 5.5 | 13.3 | 0.00 | 3.2 | 3.0 | 2.8 | 2.5 | 3.0 | 3.0 |
|  | 4 | 0.22 | 6.0 | 12.4 | 0.00 | 3.0 | 3.0 | 2.8 | 2.7 | 3.0 | 2.8 |
|  | 6 | 0.29 | 8.5 | 10.3 | 1.04 | 2.8 | 2.3 | 2.8 | 2.5 | 2.8 | 3.0 |
| Apples with ethylene absorbent | 1 | 0.42 | 5.0 | 19.0 | 0.26 | 2.8 | 3.5 | 3.2 | 2.3 | 3.0 | 2.8 |
|  | 2 | 0.30 | 9.0 | 16.8 | 0.35 | 3.3 | 3.5 | 3.5 | 3.5 | 3.5 | 3.3 |
|  | 3 | 0.32 | 7.0 | 12.8 | 1.01 | 3.2 | 3.5 | 3.2 | 2.7 | 3.3 | 3.3 |
|  | 4 | 0.34 | 8.5 | 12.2 | 0.27 | 3.0 | 3.0 | 3.0 | 2.3 | 3.0 | 2.5 |
|  | 6 | 0.34 | 6.0 | 10.7 | 0.53 | 2.8 | 3.0 | 3.0 | 2.2 | 2.8 | 2.8 |
| Apples with deoxidant | 1 | 0.35 | 7.0 | 17.4 | 0.53 | 3.0 | 3.7 | 3.2 | 2.5 | 3.2 | 3.0 |
|  | 2 | 0.25 | 8.5 | 13.7 | 0.00 | 3.3 | 3.3 | 3.3 | 3.0 | 3.3 | 3.3 |
|  | 3 | 0.31 | 5.0 | 12.2 | 0.79 | 3.3 | 3.3 | 3.2 | 2.8 | 3.5 | 3.2 |
|  | 4 | 0.42 | 10.0 | 9.7 | 0.73 | 2.8 | 1.7 | 2.3 | 2.5 | 2.2 | 2.2 |
|  | 6 | 0.33 | 12.0 | 8.7 | 1.04 | 2.8 | 2.5 | 2.7 | 2.8 | 2.3 | 2.2 |
| Apples with ethylene absorbent + deoxidant | 1 | 0.39 | 10.0 | 17.6 | 0.52 | 3.0 | 3.5 | 3.2 | 2.7 | 3.5 | 3.0 |
|  | 2 | 0.45 | 9.0 | 16.0 | 0.97 | 3.3 | 3.5 | 3.5 | 2.5 | 3.3 | 3.3 |
|  | 3 | 0.37 | 8.0 | 15.5 | 3.13 | 3.5 | 3.8 | 3.5 | 2.7 | 3.2 | 3.7 |
|  | 4 | 0.32 | 8.0 | 13.4 | 0.53 | 3.5 | 3.3 | 3.0 | 2.7 | 3.7 | 3.3 |
|  | 6 | 0.32 | 7.0 | 9.6 | 1.01 | 2.8 | 2.8 | 2.8 | 2.5 | 2.8 | 3.0 |

TABLE 2

|  |  | acidity (%) | saccharine degree (%) | hardness (lb/cm$^2$) | weight decrease ratio (%) | Organoleptic tests ||||||
|---|---|---|---|---|---|---|---|---|---|---|---|
|  | week |  |  |  |  | succulence | hardness | sourness | sweetness | freshness | total |
| Initial conditions | 0 | 0.23 | 11.0 | 12.9 | 0 | 3.7 | 3.7 | 3.5 | 3.2 | 3.8 | 4.0 |
| Untreated apples in paper bag | 3 | 0.19 | 10.0 | 11.4 | 1.28 | 3.2 | 2.7 | 3.0 | 3.3 | 3.0 | 3.2 |
|  | 4 | 0.16 | 9.5 | 10.9 | 1.75 | 3.0 | 2.8 | 2.5 | 2.2 | 2.5 | 2.7 |
|  | 5 | 0.19 | 10.0 | 10.9 | 3.59 | 2.8 | 2.7 | 2.5 | 3.2 | 2.3 | 2.5 |
|  | 6 | 0.17 | 10.5 | 10.8 | 3.40 | 3.2 | 2.7 | 2.5 | 2.8 | 2.8 | 2.8 |
|  | 7 | 0.17 | 10.5 | 10.7 | 5.13 | 2.7 | 2.5 | 2.2 | 2.8 | 2.8 | 2.8 |
|  | 8 | 0.14 | 9.0 | 11.5 | 5.14 | 2.7 | 2.4 | 2.2 | 2.7 | 2.4 | 2.4 |
| Untreated apples in polyethylene bag | 3 | 0.22 | 11.0 | 13.7 | 0.00 | 4.0 | 3.5 | 3.0 | 3.7 | 3.7 | 3.7 |
|  | 4 | 0.21 | 10.0 | 12.1 | 0.00 | 3.5 | 3.2 | 2.8 | 3.2 | 3.5 | 3.7 |
|  | 5 | 0.20 | 10.5 | 11.6 | 0.19 | 3.3 | 2.8 | 2.5 | 2.8 | 3.0 | 3.0 |
|  | 6 | 0.16 | 9.5 | 12.5 | 0.38 | 3.5 | 3.3 | 3.0 | 3.0 | 3.5 | 3.3 |
|  | 7 | 0.18 | 10.5 | 13.8 | 0.29 | 3.0 | 2.5 | 2.0 | 2.5 | 2.7 | 2.8 |
|  | 8 | 0.16 | 8.0 | 10.8 | 0.91 | 3.3 | 3.0 | 2.3 | 2.8 | 2.8 | 2.8 |
| Apples with ethylene absorbent | 3 | 0.20 | 10.0 | 11.8 | 1.43 | 3.2 | 2.8 | 3.0 | 3.0 | 3.5 | 3.3 |
|  | 4 | 0.18 | 10.0 | 12.1 | 0.00 | 3.3 | 3.3 | 2.5 | 3.0 | 3.3 | 3.5 |
|  | 5 | 0.17 | 10.0 | 12.5 | 0.77 | 3.2 | 3.2 | 2.8 | 3.0 | 3.2 | 3.3 |
|  | 6 | 0.18 | 10.0 | 11.9 | 0.58 | 3.5 | 3.3 | 2.5 | 2.8 | 3.2 | 3.5 |
|  | 7 | 0.18 | 10.0 | 11.8 | 0.72 | 3.2 | 3.0 | 2.3 | 2.8 | 2.8 | 3.0 |
|  | 8 | 0.20 | 9.0 | 11.2 | 1.67 | 3.7 | 3.3 | 2.7 | 3.0 | 3.5 | 3.5 |
| Apples with deoxidant | 3 | 0.20 | 10.0 | 12.7 | 0.20 | 3.3 | 3.3 | 3.3 | 3.7 | 3.3 | 3.3 |
|  | 4 | 0.16 | 9.5 | 11.5 | 0.00 | 3.2 | 3.0 | 2.5 | 3.2 | 3.2 | 3.2 |
|  | 5 | 0.14 | 10.0 | 10.5 | 0.99 | 3.2 | 2.8 | 2.7 | 2.8 | 3.0 | 2.8 |
|  | 6 | 0.14 | 10.0 | 12.3 | 0.96 | 3.3 | 3.5 | 2.8 | 2.8 | 3.7 | 3.2 |
|  | 7 | 0.16 | 10.0 | 11.7 | 1.47 | 3.0 | 2.8 | 2.8 | 2.8 | 2.7 | 3.2 |
|  | 8 | 0.22 | 10.0 | 9.6 | 1.97 | 3.3 | 3.0 | 2.5 | 2.8 | 2.8 | 3.0 |
| Apples with ethylene absorbent and deoxidant | 3 | 0.20 | 10.0 | 12.3 | 0.29 | 3.3 | 3.3 | 2.5 | 2.7 | 3.2 | 3.3 |
|  | 4 | 0.20 | 10.0 | 11.0 | 0.49 | 3.5 | 3.8 | 3.2 | 3.0 | 3.8 | 3.8 |
|  | 5 | 0.19 | 10.0 | 13.1 | 0.78 | 3.5 | 3.5 | 2.7 | 2.8 | 3.3 | 3.2 |
|  | 6 | 0.16 | 10.0 | 12.5 | 0.48 | 3.3 | 3.3 | 2.7 | 2.7 | 3.5 | 3.5 |
|  | 7 | 0.20 | 10.0 | 12.3 | 0.41 | 3.2 | 3.2 | 2.5 | 2.7 | 3.2 | 3.2 |
|  | 8 | 0.22 | 7.0 | 14.0 | 2.80 | 3.3 | 3.5 | 2.7 | 2.7 | 3.2 | 3.2 |

What is claimed is:

1. A package containing fruits, said package comprising a case and a sealed resilient bag containing said fruits, said case comprising a front plate, a rear plate aligned with said front plate and connected to said front plate by side walls; said front plate having a plurality of spaced openings of a size sufficient to allow said fruits to project through said openings and forward of said front plate, and said sealed resilient bag containing said fruits being positioned in said case such that the sealed bag rests on the rear plate and said front plate depresses the bag between the fruits towards the rear plate with resilient deformation such that each fruit disposed in said bag partly projects from a respective one of said openings and is stationarily supported in said bag by the resilient deformation of the bag.

2. A package in accordance with claim 1, wherein said fruits are of a type which produces ethylene in the process of ripening, said bag including at least one of the ethylene absorbent and a deoxidant therein.

3. A package as defined in claim 1 wherein said case comprises a hollow hexahedral box.

4. A package as defined in claim 1 wherein the rear plate comprises a pair of elongated rectangular side flaps integrally formed at the respective opposite side edges.

5. A package as defined by claim 1 further comprising a handle attached to the case.

6. A package for containing fruits, said package comprising a case and a sealable resilient bag for containing said fruits, said case comprising a front plate, a rear plate aligned with said front plate and connected to said front plate by side walls; said front plate having a plurality of spaced openings, and said sidewalls and said openings being of a size to allow said fruits, when positioned between said front and rear plates, to project through said openings and forward of said front plate; said sealable resilient bag for containing said fruits being of a size relative to said fruits and said case such that, when sealed and containing said fruits and being positioned in said case, said sealed bag rests on the rear plate and said front plate depresses the bag between the fruits towards the rear plate with resilient deformation such that each fruit disposed in said bag partly projects from a respective one of said openings and is stationarily supported in said bag by the resilient deformation of the bag.

* * * * *